April 30, 1935.   P. WARLOP   1,999,266
SYSTEM OF LUBRICATION
Filed Feb. 10, 1934   2 Sheets-Sheet 1
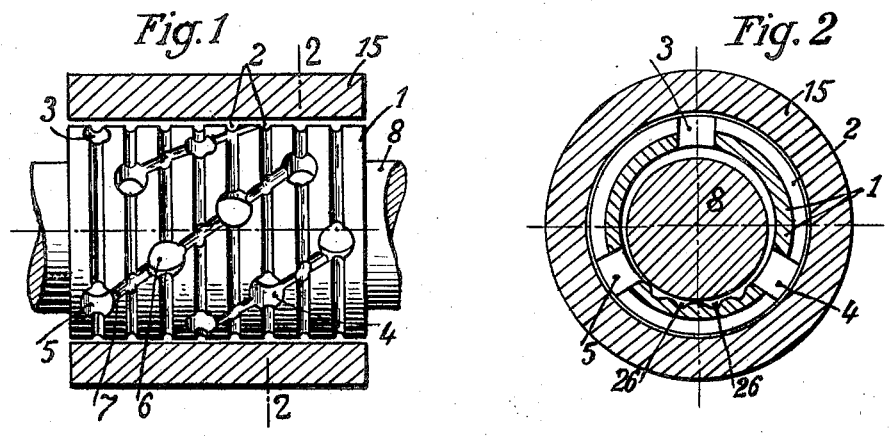
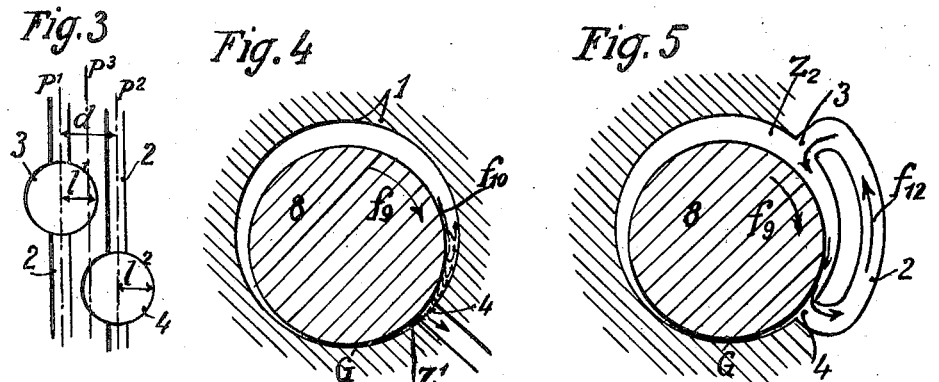
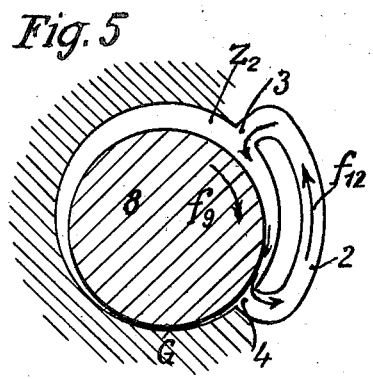
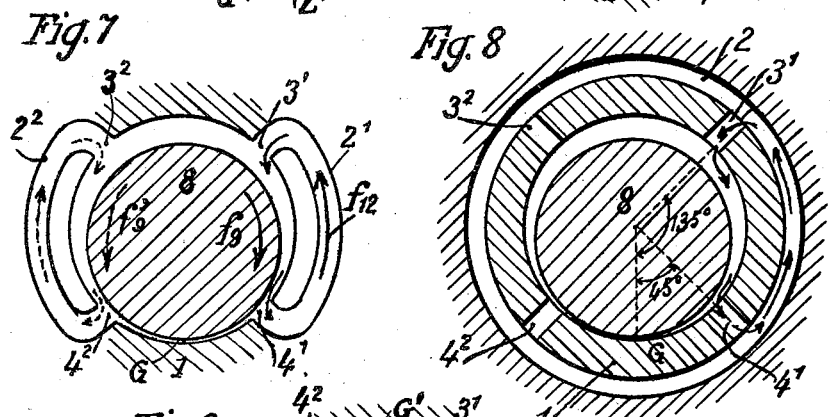
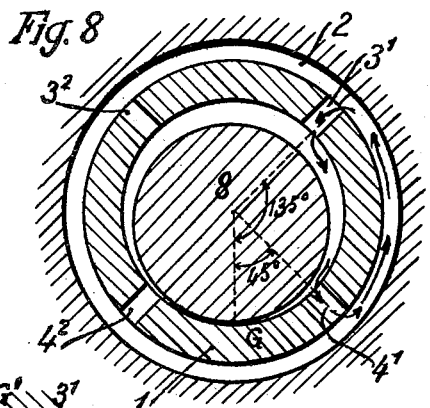
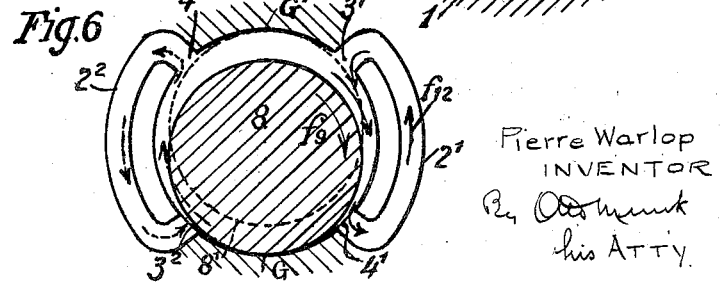
Pierre Warlop
INVENTOR
his ATTY.

April 30, 1935. P. WARLOP 1,999,266
SYSTEM OF LUBRICATION
Filed Feb. 10, 1934   2 Sheets-Sheet 2

Pierre Warlop
INVENTOR
By Otto Munk
his ATTY.

Patented Apr. 30, 1935

1,999,266

UNITED STATES PATENT OFFICE 1,999,266

SYSTEM OF LUBRICATION

Pierre Warlop, Noisy-le-Sec, France

Application February 10, 1934, Serial No. 710,659
In France February 21, 1933

4 Claims. (Cl. 308—121)

The object of the present invention is to facilitate the penetration of a lubricating film between the surfaces of a bearing, to ensure the durability of the film and to increase the resultant effect by reducing the frictional resistances developed.

A further object is to provide a lubricating system, the component parts of which are easy to manufacture and readily interchangeable.

It further aims at ensuring support for the members in motion under the best conditions of working, and automatically compensating for wear, while, at the same time, preventing the bearing surfaces from becoming oval in form.

The members of the lubricating system which allows achieving of the objects above specified are characterized by the features set forth in the description below and in the claims annexed at the end of the said description.

Practical constructional forms of lubricating systems according to the invention are illustrated, by way of example in the accompanying drawings, wherein:

Figs. 1 and 2 represent, respectively, an elevation view with the support in section and a transverse section of one practical construction.

Fig. 3 represents a partial view of the outer surface of the bearing (journal).

Figs. 4–8 are diagrammatic sections intended to explain the manner in which the lubricating system acts.

Figure 9:
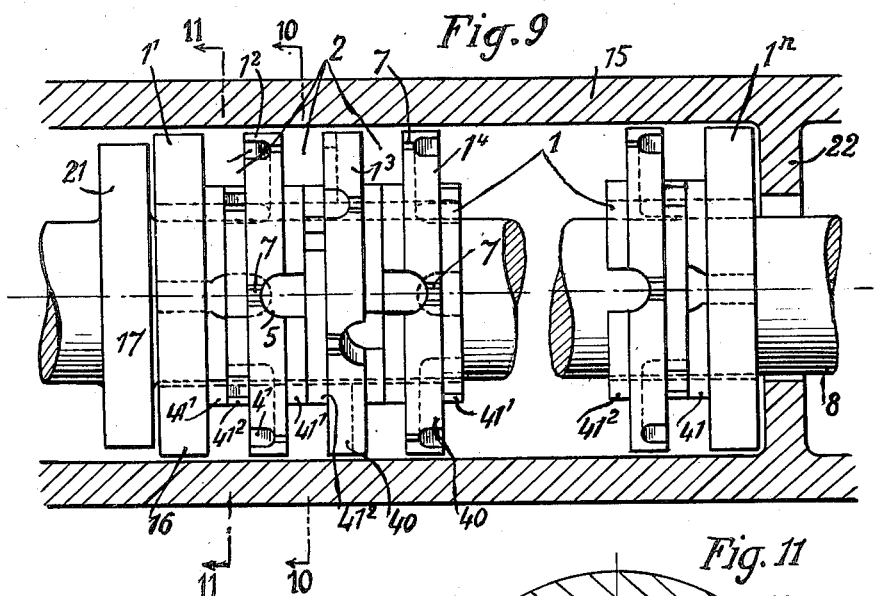
Fig. 9 represents an elevation view of a second form of practical construction.
Figure 11:
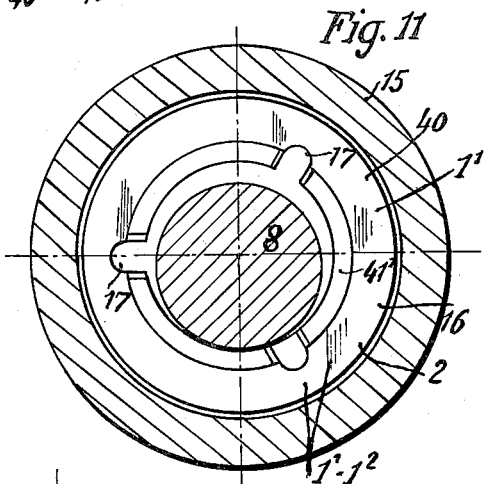
Figure 10:
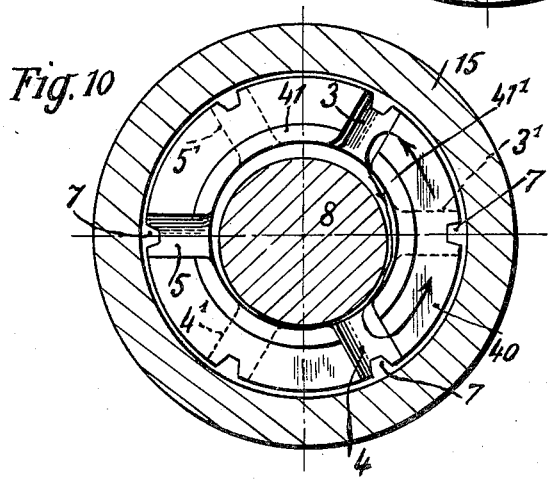

Figs. 10 and 11 are two sections taken along the lines 10—10 and 11—11 in Fig. 9 respectively.

The lubricating system illustrated in Figs. 1–8 is intended for use with a shaft 8 rotating in a bearing or journal 1; this shaft 8 has a diameter somewhat less than that of the bore of the bearing 1 whereby a certain amount of play is possible between the bearing surfaces; the lubricating oil is conducted into the free space produced between the bearing surfaces by any suitable means.

An aperture 4, representing the outlet, is cut between the bearing surfaces in the neighbourhood of the point of minimum thickness of the lubricating film, called, for the sake of simplicity, the bearing generatrix G, and upstream from the said generatrix relatively to the direction ($f^9$) of motion, that is to say, to the rotation of the shaft 8 according to the arrow $f^9$ above.

At the time of starting (Fig. 4), the outlet aperture 4 cut in the vicinity of the bearing generatrix G ensures the formation of direct currents and, in consequence, the development of pressures which increase up to the neighbourhood of the said generatrix G. The aperture 4, being of small dimensions, the fluid diverted therethrough does not involve any appreciable pressure-drop in the neighbourhood of the bearing generatrix and lifting of the shaft 8 is produced so as to allow the formation of a film of lubricant thereunder.

After starting and throughout the ordinary rotation of the shaft 8, the aperture 4 permits the circulation of currents of the lubricating medium which, in general, would not have been able to pass through the reduced cross section of the film at the point of minimum thickness and, as a result of this arrangement, the circulation of the lubricating medium is greatly improved.

At the same time the width of the zone where the return currents are usually formed is diminished; in consequence, the passive resistances caused by viscosity are appreciably lowered and the coefficients of friction are very much reduced; under certain conditions, these coefficients of friction are sensibly lower than those which are experienced with ball bearings.

In the constructional arrangement illustrated in Figs. 1–8, the aperture 4, which represents the outlet for the lubricant, is combined with return channels which conduct the lubricant passing through the said aperture. To this end, there is provided an aperture 3 (Fig. 5) for the readmission of the lubricant which discharges between the bearing surfaces, within a zone $Z^2$ of less pressure, at an appreciable distance from the bearing generatrix G and, for example, upstream from the said generatrix. This readmission aperture 3 is in communication with the discharge aperture 4 by means of a channel 2, which constitutes a reservoir for the return of the lubricant.

As the lubricating oil set free by the aperture 4 (Fig. 5) is conducted between the bearing surfaces along the channel 2, constituting the reservoir and through the orifice 3 there is established a closed circuit for the lubricant acting on the bearing surfaces, to the reservoir 2, the oil being returned to the bearing surfaces, and the entire circuit co-operating to ensure the maintenance of the oil film between the bearing surfaces.

As the charge may be directed, alternately, in two opposite directions, the channels for the passage of the oil are duplicated in a symmetrical manner relatively to the axis of the bearing. Hence (Fig. 6) two discharge apertures $4^1$, $4^2$ are arranged upstream from two bearing generatrices G, G¹ corresponding to the two opposite positions 8 and 8¹ of the shaft, and these apertures 4¹, 4² are put in communication, respectively, with the readmission apertures 3¹, 3² by means of channels 2¹, 2², which represent return reservoirs and are situated symmetrically relatively to the axis of the bearing.

On the other hand, as the shaft is capable of rotating in two opposite directions, the discharge apertures and the readmission apertures 3¹, 3² (Fig. 7) and the return reservoir 2¹, 2² are duplicated in a symmetric manner relatively to a single bearing generatrix G.

Hence, whatever the direction of rotation of the shaft 8 may be, there is ensured the discharge of any excess lubricant through the discharge aperture 4¹ or 4² and the regular formation of the film of oil between the bearing surfaces.

The pressures of the film are produced mainly in the area adjacent to the bearing generatrix upstream from the said generatrix; as a result, the first group of two apertures 3¹, 4¹, which produces its useful effect for a given direction of the charge and of the direction of rotation is in no way impeded in its effect by the second group 3², 4² which is intended to produce a similar effect for the other direction of the charge or of the rotation.

Thus, the arrangement represented in Figs. 1 and 2 comprises a channel constituting a circular, transverse reservoir 2 independent of the clearance formed by the play between the shaft 8 and the bearing 1, the said reservoir channel 2 ensuring the continuity of the circulation of the derived return circuit. Apertures 3¹, 4¹, 3², 4² thus discharge on the one side into the space provided between the bearing surfaces and, on the other, into the independent reservoir 2 (Fig. 8).

A certain number of the above mentioned apertures may, with advantage, be arranged at an angle of 90° to each other and at an angle of 45° or 135° to the bearing generatrix G. Under these conditions, the aperture 4¹ at an angle of 45° upstream from the bearing generatrix, plays the part of a discharge aperture for the oil, while the aperture 3¹ at an angle of 135° upstream from the said generatrix, ensures the readmission of the lubricant.

The resultant effects will still be favourable even though the position of the bearing generatrix should be somewhat modified relatively to the apertures.

In the lubricating system shown in Figs. 1 and 2 the bearing is advantageously made up of several transverse sections, into each of which discharge outlet apertures for the lubricating medium, these various apertures being angularly displaced (or staggered) relatively to each other from one section to the other in such a manner that there are invariably a certain number of apertures which are in a position specially favourable for the formation or the maintenance of the film whatever the position of the bearing generatrix may be.

The bearing 1 (Fig. 1) is provided on its periphery with a series of circular grooves which constitute a return reservoir for the lubricant and each of these grooves is in communication with the inner surface of the bearing by means of apertures 3, 4, 5.

The apertures 3, 4, 5 (Fig. 3) extend in the axial direction over a width $l^1+l^2$ which is greater than the distance $d$, which separates the median planes $P^1$, $P^2$ of two consecutive grooves 2, in such a manner that every transverse plane $P^3$ perpendicular to the axis cuts at least the apertures of one groove 2.

In general, every line traced on the bearing surface parallel to the direction of motion intersects at least one aperture such as 3, 4, 5.

These apertures 3, 4, 5 have different cross-sections and are arranged in staggered formation on spirals along which are cut oblique grooves 7 of intercommunication which establish communication between the apertures 3, 5, 6 of the various transverse sections of the bearing.

In addition, the lubricating system shown in Figs. 1 and 2 is advantageously made to include intermediate channels 26 (Fig. 2), which are entirely closed and are formed on one of the bearing surfaces; these intermediate channels 26 are arranged transversely to the path of the oil film and do not receive any supply from the outside except from the oil film itself and co-operate with the passage channel for the oil as specified above, for the formation and maintenance of the film between the bearing surfaces.

These intermediate channels may advantageously be provided with rounded edges so as to facilitate the inflow of the oil film into each channel and thereafter the outflow of the film from the same, this arrangement again co-operating for the maintenance of the film in conditions of optimum regularity over its entire width.

In the practical arrangement shown in Figs. 9–11, the journal or bearing 1 consists of several elements 1², 1³, 1⁴ separated one from the other and distributed lengthwise over the shaft to be supported. These elements 1², 1³, 1⁴ are held against each other by means of end members 1¹, 1ⁿ which themselves bear on support surfaces such as collars 21 on the shaft 8 and stationary abutments 22 integral with the support 15.

The intermediate elements 1², 1³, 1⁴ are similar and have the form of a ring the bore of which is a little greater than the diameter of the shaft 8, allowing a certain amount of play for the circulation of the lubricant.

Each ring 1², 1³, 1⁴ (Figs. 9 and 10) is provided at one side with a central rib 40 of a diameter a little less than that of the bore of the support 15 and, on the other side, with lateral shoulders 41¹, 41² arranged on either side of the central rib 40.

The shoulders 41¹, 41² of two neighbouring elements 1², 1³ form along with the ribs 40 of the said elements, the reservoir 2 for the return flow of the lubricant.

Furthermore, apertures 3, 4, 5 and 3¹, 4¹, 5¹ for the flow of the lubricant are cut on either side of the central rib 40 and ensure the formation of derived circuits under the conditions described in full detail above. These apertures 3, 4, 5, 3¹, 4¹, 5¹ for the flow of the lubricating medium are provided with rounded extremities of nozzle form, this arrangement facilitating the circulation of the lubricant.

Notches 7 cut in the central rib 40 establish communication between the two faces of the said rib and allow the lubricant to circulate freely from one reservoir 2 to the succeeding one by which means there is realized a continuous network for the lubrication over the entire area of the bearing surfaces.

The rings of the end members 1¹, 1ⁿ are constituted in a manner slightly different from the intermediate rings 1², 1³ . . . More particularly, the rings of end members 1¹, 1ⁿ have only one shoulder 41 so as to preclude any escape of lubricant to the outside. In addition, transverse channels 17 ensure ultimately the distribution of the lubricant over the bearings of the journal such as the collars 21 on the shaft.

The construction of the bearing of multiple elements permits mass production and the production of bearings which are exactly adapted for a definite installation.

According to another method of construction, the bearing is not subdivided by means of reservoirs 2 but by the axis of ribs 40.

What I claim as my invention and desire to secure by Letters Patent is:—

1. In a lubricating system; bearing surfaces such as shafts rotating within bearings; a plurality of ports for the outflow of the lubricant opening between the bearing surfaces in the neighborhood of the bearing generatrix and upstream therefrom with respect to the direction of motion, said ports being at different angular distances from the generatrix; a plurality of ports for the readmission of lubricant opening between the bearing surfaces at an appreciable distance from the bearing generatrix and upstream from the outflow ports in a zone of pressure lower than at the outflow ports, the readmission ports being at different angular distances from the bearing generatrix; and a continuous closed conduit connecting each outflow port with a corresponding readmission port.

2. In a lubricating system; bearing surfaces such as shafts rotating within bearings; a plurality of discharge ports for the lubricant opening between the bearing surfaces in the neighborhood of the bearing generatrix and upstream therefrom with respect to the direction of motion, said ports being arranged in several different transverse sections of the bearing surfaces and opening into the latter at different angular distances with respect to the generatrix; ports for the readmission of lubricant opening between the bearing surfaces at a substantial distance from the bearing generatrix upstream from the discharge ports and in a lower pressure zone than the latter, the readmission ports being arranged in several different transverse sections of the bearing surfaces, and opening into the latter at different angular distances from the generatrix; and a continuous closed conduit connecting each discharge port with a corresponding readmission port.

3. In a lubricating system; bearing surfaces such as shafts rotating within bearings; discharge ports for the lubricant opening between the bearing surfaces in the neighborhood of the bearing generatrix and upstream therefrom with respect to the direction of motion, said discharge ports being arranged in several different sections of the bearing surfaces and opening into the latter at different angular distances from the generatrix, the dimensions of said ports being such that any line traced on the surface of the bearing in the direction of the motion encounters at least two of said ports; readmission ports for the lubricant opening between the bearing surfaces at a substantial distance from the generatrix and upstream with respect to the discharge ports in a lower pressure zone than that of the discharge ports, said readmission ports being arranged in several different transverse sections of the bearing surfaces and opening into the latter at different angular distances with respect to the generatrix, said readmission ports having such dimensions that any line traced on the bearing surface in the direction of motion encounters at least two of them; and a continuous closed conduit connecting each discharge port with a corresponding readmission port.

4. In a lubricating system; bearing surfaces such as shafts rotating within bearings; a plurality of discharge ports for the lubricant opening between the bearing surfaces in the neighborhood of the bearing generatrix and upstream therefrom with respect to the direction of motion, said discharge ports being arranged in several different transverse sections of the bearing surfaces, and opening into the latter at different angular distances with respect to the generatrix; readmission ports for the lubricant opening between the bearing surfaces at a substantial distance from the generatrix and upstream with respect to the discharge ports in a lower pressure zone than the latter, said readmission ports being arranged in several different transverse sections of the bearing surfaces and opening into the latter at different angular distances with respect to the generatrix; a continuous closed conduit connecting each discharge port with a corresponding readmission port and forming part of a closed lubricating circuit for each of said transverse sections; and connections between said closed circuits interconnecting the different transverse sections.

PIERRE WARLOP.